United States Patent
Lang et al.

(10) Patent No.: US 6,726,615 B1
(45) Date of Patent: Apr. 27, 2004

(54) METHOD OF FOLDING A GAS BAG FOR A VEHICLE OCCUPANT RESTRAINT SYSTEM, A FOLDED GAS BAG FOR A VEHICLE OCCUPANT RESTRAINT SYSTEM AND A DEVICE FOR PERFORMING THE METHOD

(75) Inventors: Norbert Lang, Leinzell (DE); Josef Aich, Heubach/Lautern (DE); Jürgen Berger, Mutlangen (DE); Reiner Dannenhauer, Welzheim (DE); Adolf M. Kuhn, Welzheim (DE)

(73) Assignee: TRW Occupant Restraint Systems GmbH, Alfdorf (DE)

( * ) Notice: Subject to any disclaimer, the term of this patent is extended or adjusted under 35 U.S.C. 154(b) by 0 days.

(21) Appl. No.: 08/956,716

(22) Filed: Oct. 23, 1997

(30) Foreign Application Priority Data

Oct. 28, 1996 (DE) .................... 296 18 772 U
Jan. 22, 1997 (DE) ........................ 197 02 147

(51) Int. Cl.⁷ ................................ B31B 1/26
(52) U.S. Cl. ..................... 493/405; 493/244; 493/450; 493/451; 493/458; 280/728.1; 280/743.1
(58) Field of Search ................ 493/405, 450, 493/451, 458, 243, 244; 280/728.1, 743.1

(56) References Cited

U.S. PATENT DOCUMENTS

| 5,022,676 | A |   | 6/1991  | Rogerson et al. |         |
|-----------|---|---|---------|-----------------|---------|
| 5,140,799 | A |   | 8/1992  | Satoh           |         |
| 5,300,011 | A | * | 4/1994  | Budde et al.    | 493/405 |
| 5,360,387 | A | * | 11/1994 | Baker           | 493/405 |
| 5,375,393 | A |   | 12/1994 | Baker et al.    |         |
| 5,391,137 | A | * | 2/1995  | DePoy et al.    | 493/405 |
| 5,456,651 | A |   | 10/1995 | Baker et al.    |         |
| 5,615,915 | A | * | 4/1997  | Magoteaux       | 280/743.1 |
| 5,690,358 | A | * | 11/1997 | Marotzke        | 493/743.1 |
| 5,782,737 | A | * | 7/1998  | Warner          | 493/405 |
| 5,795,284 | A | * | 8/1998  | Berti           | 493/405 |
| 5,960,611 | A | * | 10/1999 | Aigner et al.   | 53/429  |

FOREIGN PATENT DOCUMENTS

| DE | 2251493      |   | 5/1973  |          |
|----|--------------|---|---------|----------|
| DE | 4422276 A1   |   | 12/1994 |          |
| DE | 4440845 A1   |   | 5/1996  |          |
| DE | 195 16 494   | * | 10/1996 | B60R/21/20 |
| EP | 0443485 A1   |   | 8/1991  |          |
| EP | 0671296 A2   |   | 9/1995  |          |
| EP | 0712760 A1   |   | 5/1996  |          |
| EP | 0734911 A1   |   | 10/1996 |          |
| FR | 2053900      |   | 4/1971  |          |
| GB | 2279046      |   | 12/1994 |          |
| WO | WO9634781    |   | 11/1996 |          |
| WO | WO9710123    |   | 3/1997  |          |
| WO | WO9745296    |   | 12/1997 |          |

* cited by examiner

Primary Examiner—Rinaldi I. Rada
Assistant Examiner—Christopher Harmon
(74) Attorney, Agent, or Firm—Tarolli, Sundheim, Covell & Tummino L.L.P.

(57) ABSTRACT

A method of folding a gas bag for a vehicle occupant restraint system is disclosed, this gas bag having a wall delimiting a chamber and having an inflation opening, the inflation opening having a rim. The method comprises the following steps: First, the gas bag is spread out on a base. Then, the rim of the inflation opening of the gas bag is held fixed. Thereafter, a plate is arranged parallel to the base and at a distance therefrom, so that the gas bag extends between the base and the plate. Subsequently, the chamber of the gas bag is exposed to a pressurized medium, so that the gas bag unfolds between the base and the plate. Finally, the wall of the gas bag is pressed inwards at a plurality of sites distributed over a circumference of the gas bag. Further, a gas bag folded by performing this method and a device for performing the method are disclosed.

11 Claims, 9 Drawing Sheets

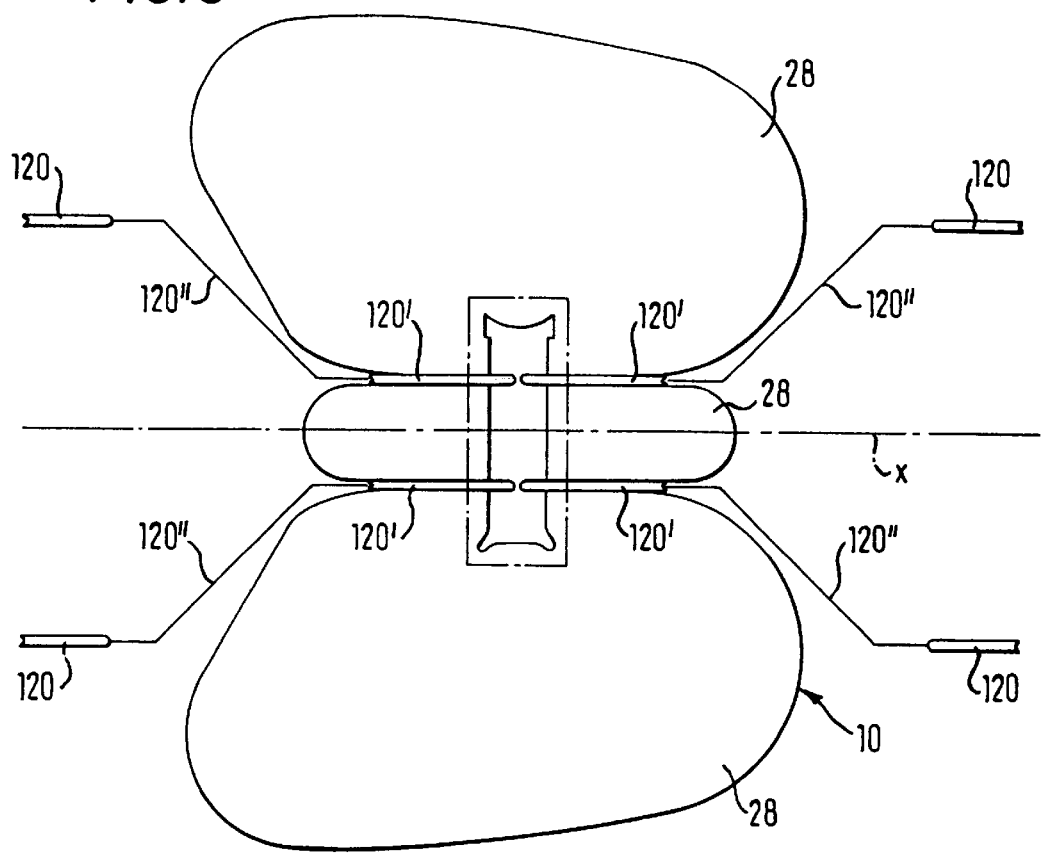
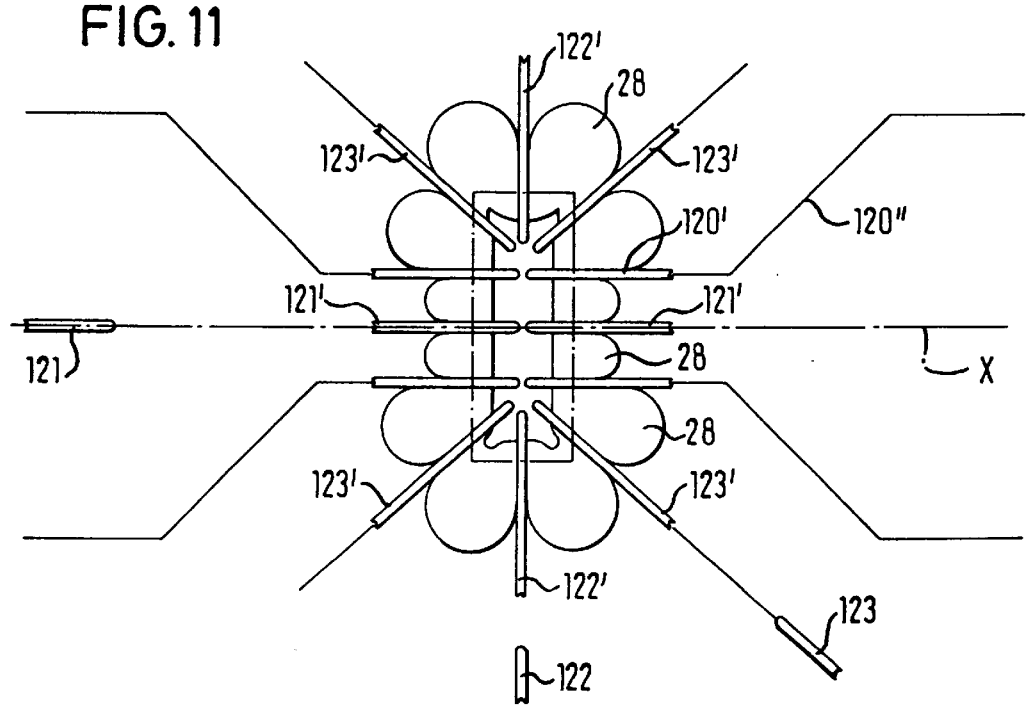

METHOD OF FOLDING A GAS BAG FOR A VEHICLE OCCUPANT RESTRAINT SYSTEM, A FOLDED GAS BAG FOR A VEHICLE OCCUPANT RESTRAINT SYSTEM AND A DEVICE FOR PERFORMING THE METHOD

The invention relates to a method of-folding a gas bag for a vehicle occupant restraint system, a folded gas bag for a vehicle occupant restraint system and also a device for performing the method.

BACKGROUND OF THE INVENTION

A restraint system for a vehicle occupant usually consists of a compressed gas source, a triggering system for this and also a gas bag which is in flow connection with the compressed gas source and after ignition of the compressed gas source can be transferred from a space-saving, folded state into an unfolded state in which it can provide a restraint effect for a vehicle occupant.

Several requirements are set for the type of folding of the gas bag. Firstly, it is to make possible as quick a transfer of the gas bag as possible from the folded into the unfolded state. Furthermore, the folding is preferably to be possible automatically. This reduces the manufacturing costs of the vehicle occupant restraint system.

BRIEF DESCRIPTION OF THE INVENTION

The invention provides a method of folding a gas bag, which method can be carried out firstly automatically without manual steps, and secondly leads to a folded gas bag which can be unfolded in a particularly advantageous manner. The method according to the invention is intended for folding a gas bag for a vehicle occupant restraint system. This gas bag has a wall delimiting a chamber and having an inflation opening, the inflation opening having a rim. The method comprises the following steps: First, the gas bag is spread out on a base. Then, the rim of the inflation opening of the gas bag is held fixed. Thereafter, a plate is arranged parallel to the base and at a distance therefrom, so that the gas bag extends between the base and the plate. Subsequently, the chamber of the gas bag is exposed to a pressurized medium, so that the gas bag unfolds between the base and the plate. Finally, the wall of the gas bag is pressed inwards at a plurality of sites distributed over a circumference of the gas bag. In this way, a gas bag is obtained which is folded together very compactly, but which nevertheless is easy to unfold. Compared with conventional folding methods, an improvement in the unfolding time of the gas bag was able to be observed. In addition, a more uniform unfolding of the gas bag and also an improved opening behavior of a cover protecting the folded gas bag, was observed. A gas bag folded by the method according to the invention has a particularly symmetrical unfolding, whereby the positioning of the gas bag during the unfolding process is improved. Due to the particularly uniform unfolding of the gas bag, its seams and its fabric are stressed less than in gas bags which are folded by conventional methods. Owing to the improved behavior on unfolding, an impact of wall parts of the unfolding gas bag onto a vehicle occupant who is to be restrained was only observed to a distinctly lesser extent and with distinctly less energy than in gas bags which are folded by conventional methods. The method according to the invention is suitable both for gas bags on the driver's side, i.e. for gas bags which are two-dimensional in the unpressurized initial state, and also for gas bags on the passenger's side, which usually have a three-dimensional form in the unpressurized initial state.

According to a preferred embodiment of the invention, provision is made that the wall is pressed inwards by a plurality of fold tongues spaced apart from each other, which each engage along a line at the wall of the gas bag, so that wall flaps lying between the fold tongues are formed. Fold tongues represent a particularly simple means to press the wall of the gas bag inwards at a plurality of locations spaced apart from each other, so that the gas bag is folded together compactly.

According to a preferred embodiment of the invention, provision is made that the wall is pressed inwards in two steps, in which in the second step the wall flaps which were formed in the first step are pressed inwards. In this way, a particularly compact, folded gas bag is achieved, the wall of which nevertheless is folded very uniformly.

According to a preferred embodiment of the invention, provision is further made that the fold tongues are pressed towards the interior of the gas bag along a straight line. In this way, the method according to the invention can be carried out in a particularly simple manner.

Furthermore, provision can be made that the fold tongues are displaced in a parallel manner on being pressed towards the interior of the gas bag. This method is advantageous in particular in gas bags on the passenger side, because by means of the parallel displacement of the fold tongues, even a gas bag which has an elongated initial shape can be folded together particularly compactly.

According to a preferred embodiment of the invention, provision is further made that the wall of the gas bag is pressed in along lines which are perpendicular to the base and the plate. In this way, it is ensured that the wall of the gas bag, on unfolding, must merely move outwards substantially without changing its direction, so that the gas bag reaches its completely unfolded form.

According to a preferred embodiment of the invention, provision can be made that after the wall of the gas bag has been pressed inwardly by means of the fold tongues, the wall is pushed together by fold sliders towards the interior of the gas bag. Due to the combination of fold tongues and fold sliders, the method according to the invention can be carried out with a particularly small effort. The fold tongues which are firstly moved into the wall of the gas bag basically determine the folding pattern to be achieved. However, instead of folding together compactly the entire wall of the gas bag by means of a plurality of fold tongues, the wall can be pushed together compactly by means of less fold sliders in a simple manner.

According to a preferred embodiment of the invention, provision can be made that the wall is pushed towards the interior of the gas bag by means of four fold sliders, in which every two fold sliders lie opposite each other in pairs and in which four fold tongues are used which lie opposite each other in pairs. The use of four fold tongues and four fold sliders represents a good compromise in which, on the one hand, a reproducible folding of the gas bag is obtained, whilst, on the other hand, the effort to carry out the method is kept small.

According to a preferred embodiment of the invention, provision is made that the chamber of the gas bag is exposed to an excess pressure of less than 100000 Pa for unfolding between the base and the plate. This pressure is sufficient, on the one hand, to ensure a complete unfolding of the gas bag between the base and the plate, and, on the other hand, is not so high that the penetration of the fold tongues into the wall of the gas bag is opposed with an excessively high resistance. Preferably, provision is made that the chamber of the gas bag is exposed to a pressure of approximately 50000 Pa. This value has proved to be sufficient in tests.

According to a preferred embodiment of the invention, provision can further be made that after the gas bag has been exposed to pressure, the pressurized gas contained in the chamber of the gas bag can escape during the fold tongues or fold sliders being pressed in. In this way, the energy to be applied on pressing in the fold tongues or fold sliders into the wall of the gas bag is kept at a low value.

Furthermore, provision can be made that after folding the gas bag, a partial vacuum is applied to its chamber. In this way, the folded gas bag can be transferred into an even more compact form, whilst at the same time it is ensured that the folded gas bag, in particular after the removal of the fold elements, maintains its folded form before it is fixed elsewhere.

Preferably, provision is made that the base is arranged at a distance from the plate which corresponds approximately to the packing height of the folded gas bag. The packing height represents the height which the folded gas bag has in the interior of a mounting provided for it to be accommodated. When the distance between the base and the plate corresponds to this packing height, the gas bag which is folded by means of the fold tongues or fold sliders can be inserted directly into the mounting, without it having to be further folded or re-shaped.

The invention also provides a folded gas bag for a vehicle occupant restraint system. This gas bag has a wall delimiting a chamber and having an inflation opening, the inflation opening having a rim with an inflation opening in the wall of the gas bag. The wall of the gas bag runs in wall flaps which lie adjacent to each other. A gas bag of this type can be unfolded in a particularly advantageous manner. As regards the resulting advantages, reference is to be made to the explanations above.

According to a preferred embodiment of the folded gas bag, provision is made that the wall flaps, observed in a plane parallel to the plane of the inflation opening, run approximately radially with respect to the center of the gas bag. In this way, a particularly uniform unfolding behavior of the gas bag is produced.

According to the preferred embodiment, provision is further made that the gas bag has a substantially flat upper side and a substantially flat underside parallel thereto, the plane of the inflation opening being parallel to the plane defined by the underside. A gas bag, folded into such a shape, can be accommodated in a particularly space-saving manner in a mounting, as provided in the interior of a vehicle steering wheel or in a dashboard of a vehicle.

The invention also relates to a device for folding a gas bag, this gas bag having a wall delimiting a chamber and having an inflation opening, the inflation opening having a rim. The device comprises a base on which the gas bag to be folded can be spread out. The device further comprises a clamping device by which the rim of the inflation opening can be fixed, a plate which can be arranged parallel to the base at a determined distance therefrom, a device for introducing a pressurized medium into the gas bag chamber while the gas bag is held fixed by means of the clamping device, and a plurality of fold tongues displaceable between a position at a distance from a periphery of the gas bag which is unfolded between the base and the plate, and a position in which the wall of the gas bag is pressed inwardly towards the interior of the gas bag. The distance between the base and the plate is so selected that the gas bag which is unfolded between the base and the plate has a considerably flattened shape. With such a device, a gas bag can be folded together in a particularly simple and advantageous manner. With regard to the advantages of a gas bag folded together by means of this device, reference is to be made to the explanations above.

According to a preferred embodiment of the invention, provision is made that the fold tongues are displaceable in a straight line. A displacement of the fold tongues in a straight line can be achieved structurally in a particularly simple manner.

According to a preferred embodiment of the invention, provision can be made that the fold tongues are displaceable in a parallel manner along a part of their adjusting path. A parallel displacement of the fold tongues in fact requires a greater structural effort; this effort is, however, justified, because by means of such a device even a gas bag on the passenger side, which has an elongated shape in the spread-out state between the base and the plate, can be folded together particularly compactly.

Further features of the invention will be apparent from the sub-claims.

BRIEF DESCRIPTION OF THE DRAWINGS

The invention is described in further detail hereinbelow with reference to two preferred embodiments, which are illustrated in the attached drawings, in which:

FIG. 9 shows the gas bag of FIG. 8 after a first folding step;

FIG. 11 shows the gas bag of FIG. 10 after the last folding step;

DETAILED DESCRIPTION OF THE INVENTION

Figure 1:
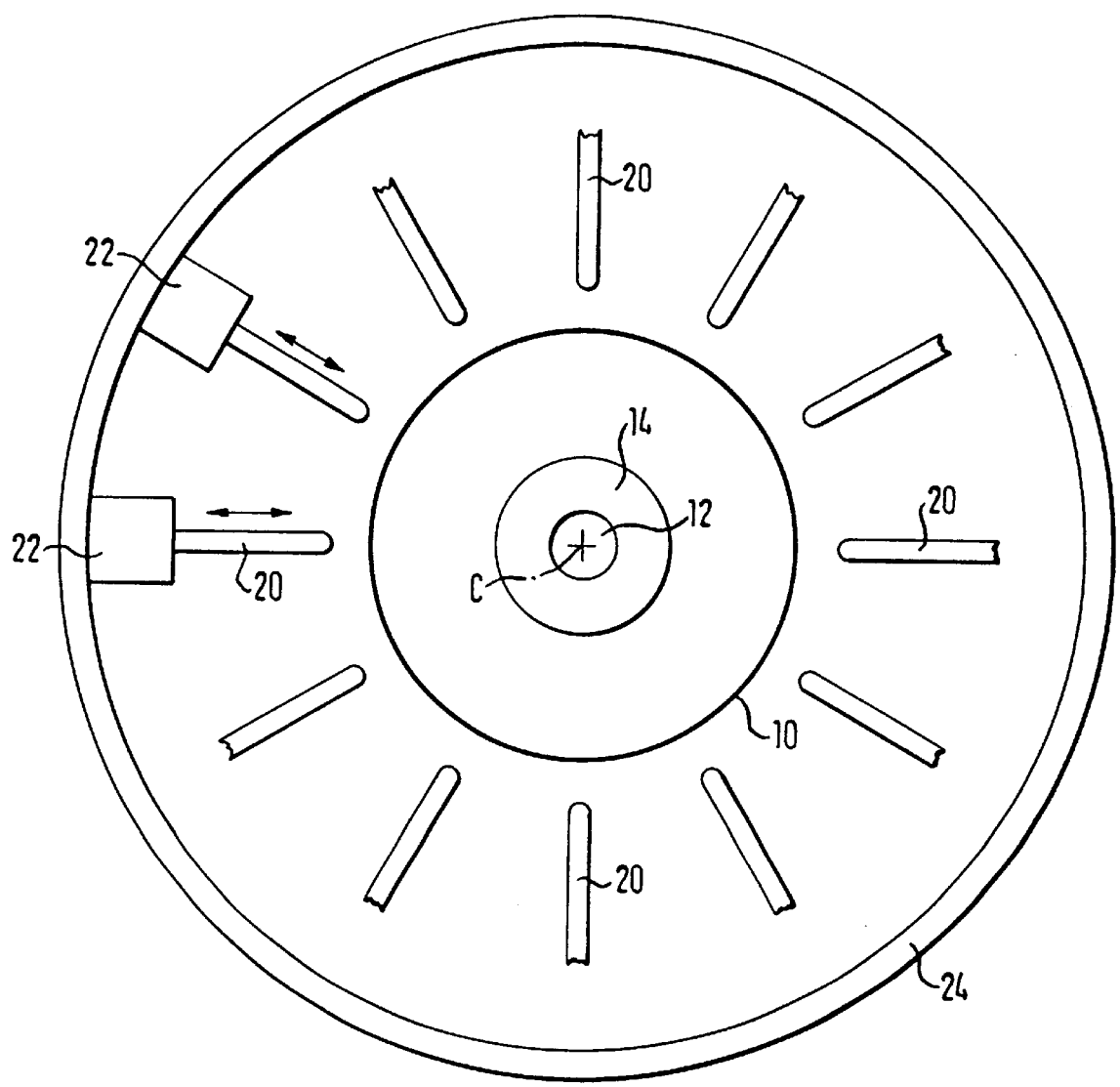
FIG. 1 shows in a diagrammatic top view a gas bag on the driver's side and a device according to the invention, by which the method according to the invention can be carried out, the device being illustrated in an initial state.
Figure 2:
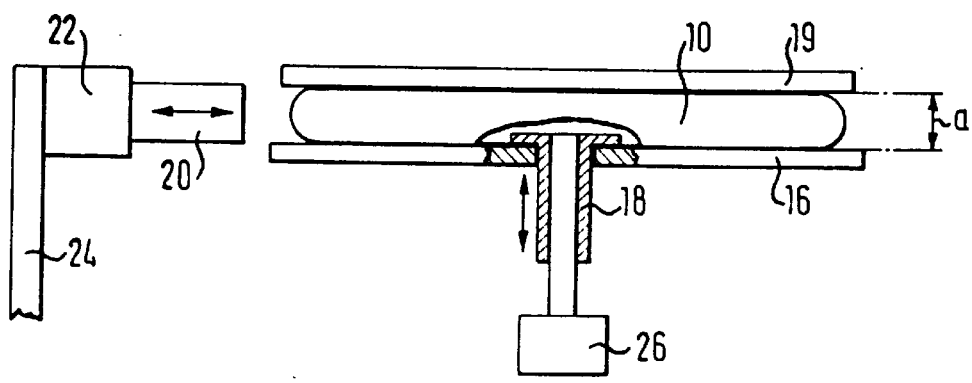
FIG. 2 shows in a diagrammatic side view the gas bag and the device of FIG. 1.
Figure 5:
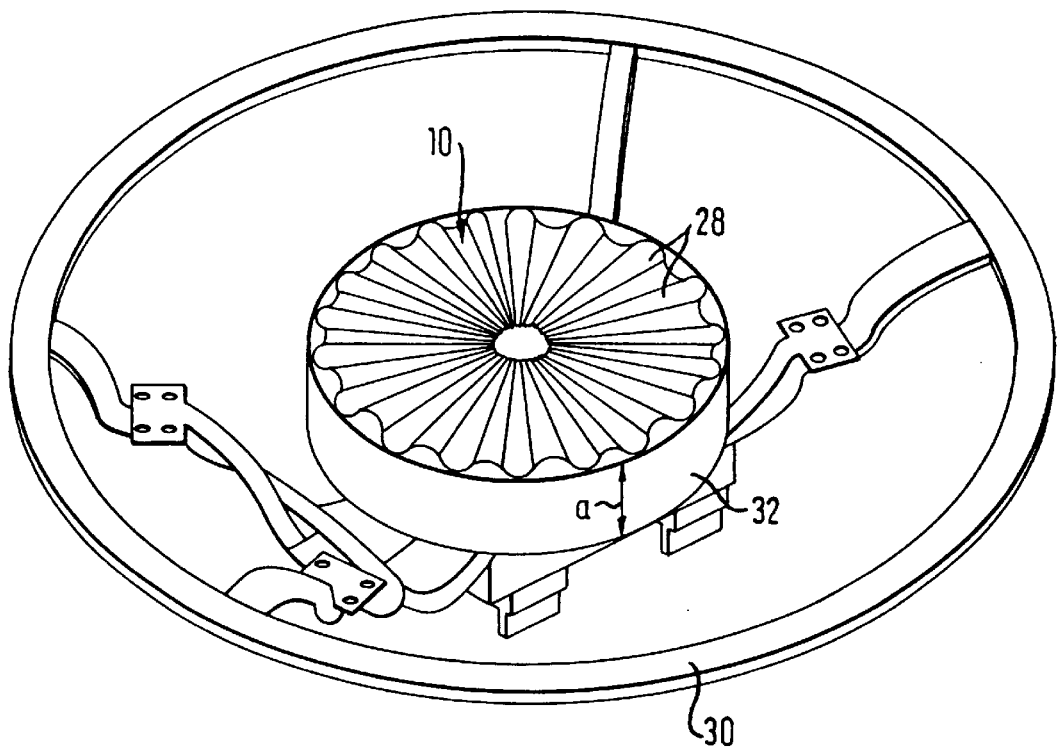
FIG. 5 shows in a diagrammatic perspective view a gas bag according to the invention, which was folded together by a device according to the invention in accordance with FIGS. 1 to 3 and is arranged on a vehicle steering wheel.

In FIGS. 1 and 2, a device according to the invention is illustrated diagrammatically, by means of which, using the method according to the invention, a gas bag, likewise illustrated in these Figures, can be folded together. An example of such a folded gas bag is illustrated in FIG. 5. The illustrated gas bag 10 is a gas bag on the driver's side, i.e. a gas bag which in the unpressurized initial state usually has a shape which is able to be spread out flat. Such a gas bag consists for example of two fabric pieces congruent to each other and is designated as a two-dimensional gas bag. The gas bag 10 has an inflation opening 12 and also a rim 14 of the inflation opening 12.

The device according to the invention contains a base 16, on which the gas bag 10 to be folded can be spread out, and also a clamping device 18, by means of which the rim 14 of the inflation opening 12 of the gas bag 10 can be fixed to the base 16. The device according to the invention further contains a plate 19 which can be arranged parallel to the base 16 and at a distance "a" (see FIG. 2) therefrom, so that the gas bag to be folded is situated between the base 16 and the plate 19.

The device according to the invention further contains a plurality of fold tongues 20 which are arranged around the gas bag, which is to be folded, generally radially with respect to its center and are movable along this radial direction. The fold tongues 20 can be moved by any suitable drive device 22, for example, hydraulic cylinders or the like. The drive device 22 for each fold tongue 20 is secured to a diagrammatically illustrated holding ring 24. For better clarity, in FIGS. 1 and 3 in each case only two drive devices 22 are illustrated. In addition, in FIG. 2 only the fold tongue 20 and the drive device 22 on the left-hand side are illustrated. As can be seen from FIG. 1, the device according to the invention is constructed symmetrically. The device according to the invention finally contains in addition a device 26 for exposing the chamber of the gas bag 10 to a desired excess pressure.

The method according to the invention is performed with the described device in the following manner: Firstly, the gas bag 10 is arranged on the base 16. Then, the rim 14 of the inflation opening 12 is fixed by means of the clamping device 18. Subsequently, the plate 19 is arranged at the predetermined distance "a" from the base 16 and parallel thereto. The distance between the plate 19 and the base 16 corresponds to the packing height desired for the folded gas bag. Thereafter, the gas bag 10 is unfolded between the base 16 and the plate 19 by means of the device 26 for introducing a pressurized medium into the gas bag chamber. Values of less than 100000 Pa have proved to be suitable values for the pressure for unfolding the gas bag. Preferably, 50000 Pa are used. In the unfolded state, the gas bag 10 has a substantially flattened shape; its height, measured perpendicularly on the plane defined by the inflation opening 12, is distinctly smaller than its diameter in a direction parallel to this plane.

Subsequently, the fold tongues 20 are pressed towards the center of the gas bag 10 or inwardly of the chamber into the interior of the gas bag from the position shown in FIGS. 1 and 2, in which they are situated at a distance from the periphery of the unfolded gas bag 10. This can be seen in FIG. 3. Each fold tongue 20 pressed into the gas bag 10 forms an indentation and between two adjacent indentations each a wall flap 28 is formed. While the fold tongues 20 are pressed into the gas bag 10, the device 26 for exposing the gas bag chamber to a determined pressure makes it possible for a portion of the pressurized gas present in the chamber of the gas bag 10 to be displaced. Here, any desired pressure which is advantageous for folding can be maintained in the chamber of the gas bag. However, it is also possible that during folding the gas bag, the volume of pressurized gas present therein can escape unhindered.

Figure 3:
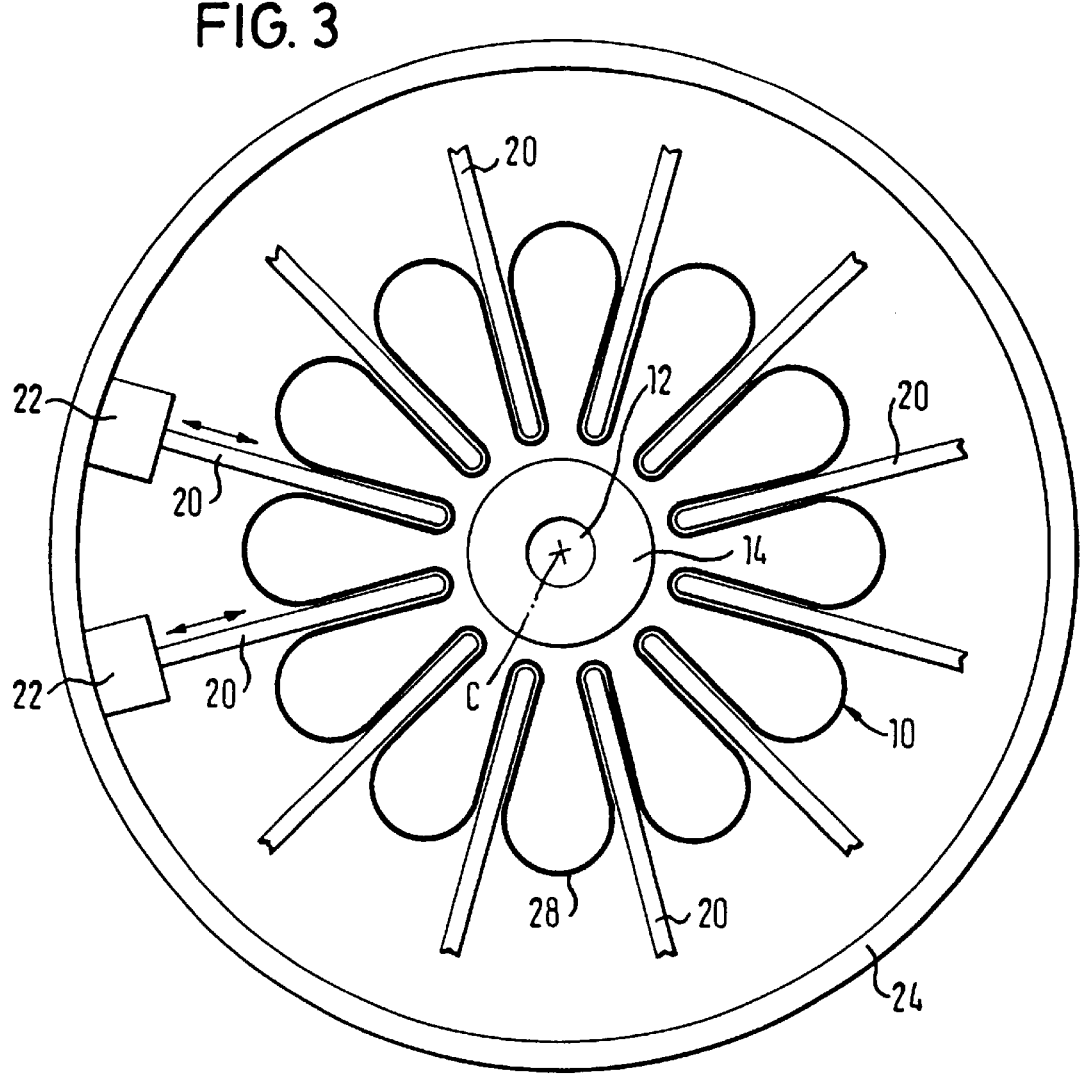
FIG. 3 shows in a diagrammatic top view the gas bag and the device of FIG. 1, the device being illustrated in an intermediate state.

In FIGS. 1 to 3, fold tongues 20 are illustrated, which each extend in one plane and are movable in this plane. All the fold tongues 20 are moved towards a central axis C of the gas bag, which is perpendicular to the plane of the inflation opening 12. In addition, the fold tongues 20 are arranged perpendicular to the base 16 and to the plate 19 and have a height which corresponds to the distance "a". However, other embodiments are also conceivable. For example, the fold tongues 20 could be arranged not radially with respect to the axis C, but could run obliquely so that the imaginary extension plane of two fold tongues each already intersect in front of the central line C. Fold tongues could also be used, the extension plane of which is not perpendicular to the base 16 and to the plate 19. Likewise, the number of fold tongues used can be increased or reduced.

Figure 4:
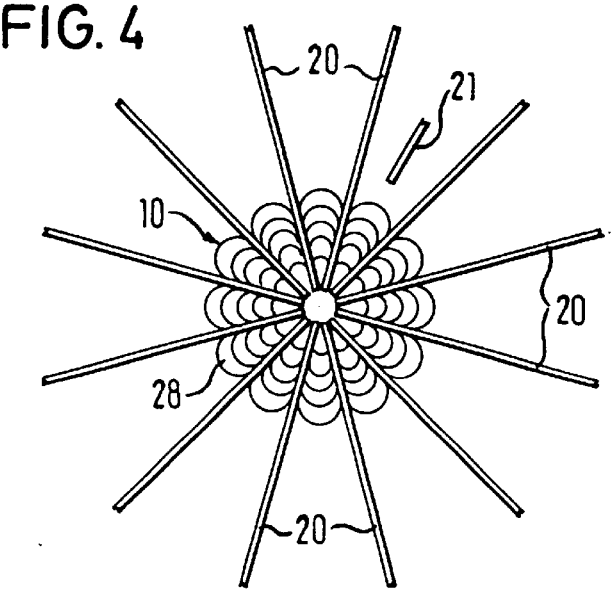
FIG. 4 shows in a diagrammatic top view a variant of the device illustrated in FIGS. 1 to 3.

In FIG. 4, a variant to FIGS. 1 to 3 is illustrated. The difference consists in that two groups of fold tongues are provided, namely the fold tongues 20 known from FIG. 1 to 3 and also additional fold tongues 21, of which only a single one is illustrated in FIG. 4 for the purpose of greater clarity. Each fold tongue 21 of the second group is arranged between two adjacent fold tongues 20 of the first group. In a second step, the fold tongues 21 are pressed into the wall flaps 28 formed the first fold tongues 20 at the first folding step, in order to further fold the gas bag. With this folding step, therefore, each wall flap 28 formed at the first folding step is divided into two wall flaps.

A partial vacuum can be applied to the chamber of the gas bag 10 by means of the device 26 which is used for exposing the gas bag chamber to a determined pressure, after the gas bag 10 has been folded by means of the fold tongues 20 or 21 into the desired shape in order to fix the folded gas bag in the obtained shape or to fold it together more compactly. In this state, the fold tongues can also be withdrawn from the gas bag without its shape altering. state, the fold tongues can also withdrawn from the gas bag without its shape altering.

In FIG. 5, a folded gas bag is illustrated, which was obtained by means of the device or the method from FIGS. 1 to 4, and is arranged on a diagrammatically illustrated vehicle steering wheel 30. In FIG. 5, the compact form of the folded gas bag is clearly to be seen, forming a package with a flat upper side and a flat underside. The individual wall flaps 28 are arranged in a star shape around the center of the folded gas bag. The folded gas bag has a packing height "a" which corresponds to the height of a mounting provided for the gas bag. To fix the gas bag, a band 32 is provided around the latter.

Figure 6:
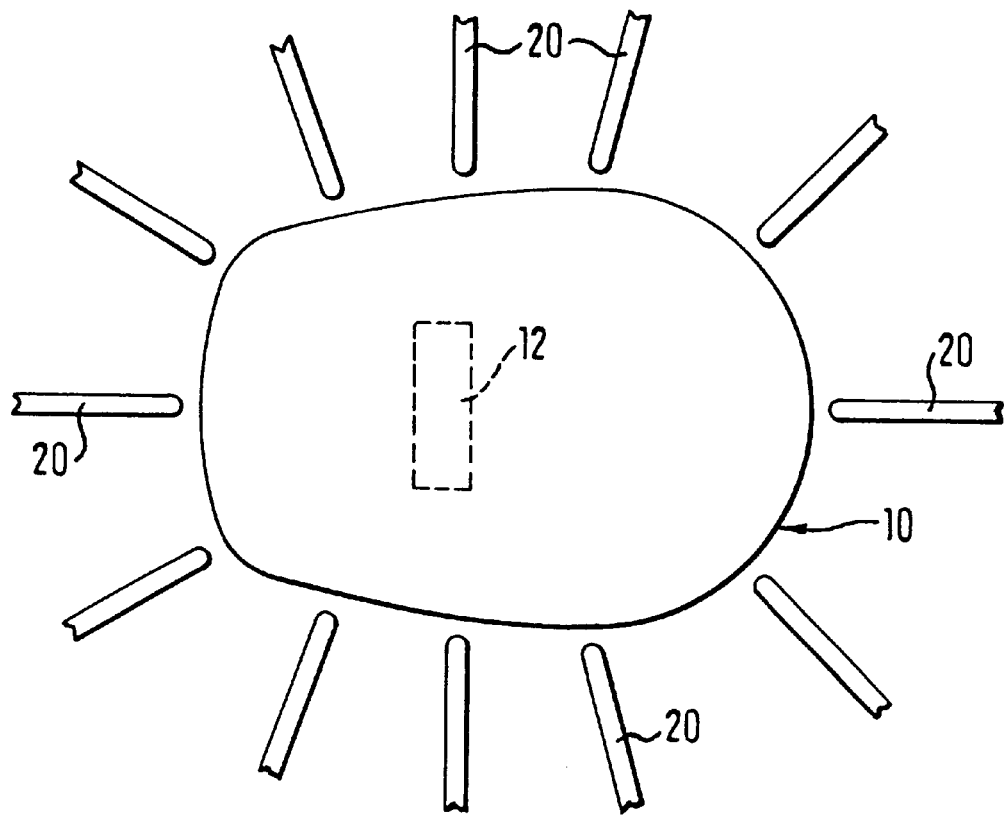
FIG. 6 shows in a diagrammatic top view a gas bag on the passenger side and a device according to the invention, by which the method according to the invention can be carried out, the device being illustrated in an initial state.

In FIG. 6, a further embodiment of the invention is to be seen diagrammatically. In contrast to FIGS. 1 to 4, in which a gas bag on the driver's side is illustrated, in FIG. 6 a gas bag on the passenger side is folded. This gas bag can generally not be spread out flat in one plane in the unpressurized initial state, for which reason it is designated as a three-dimensional gas bag. As can be seen in FIG. 6, the arrangement of the fold elements 20 is adapted to the form of the outer periphery of the gas bag which is inflated between the base 16 and the plate 19, which are not illustrated in this figure; the fold tongues 20 are therefore arranged along a rounded rectangle. Apart from the different shape of the gas bag illustrated in FIG. 6, this is folded substantially in the same manner as the gas bag illustrated in FIGS. 1 to 3.

Figure 7:
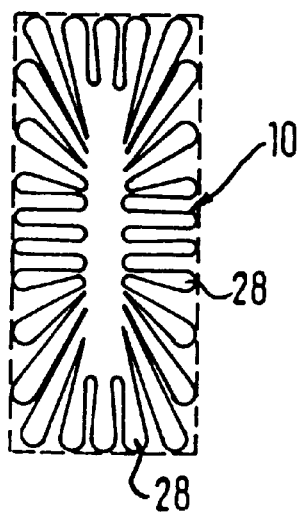
FIG. 7 shows in a diagrammatic top view a gas bag according to the invention, which was folded together by the device of FIG. 6 according to the invention, using the method according to the invention.

In FIG. 7, the gas bag of FIG. 6, folded by means of the fold tongues 20, can be seen. As a passenger gas bag generally is accommodated in an elongated mounting, the gas bag is folded to a rectangular shape. Also in this case, the wall flaps formed run approximately radially with respect to the center of the folded gas bag.

Figure 8:
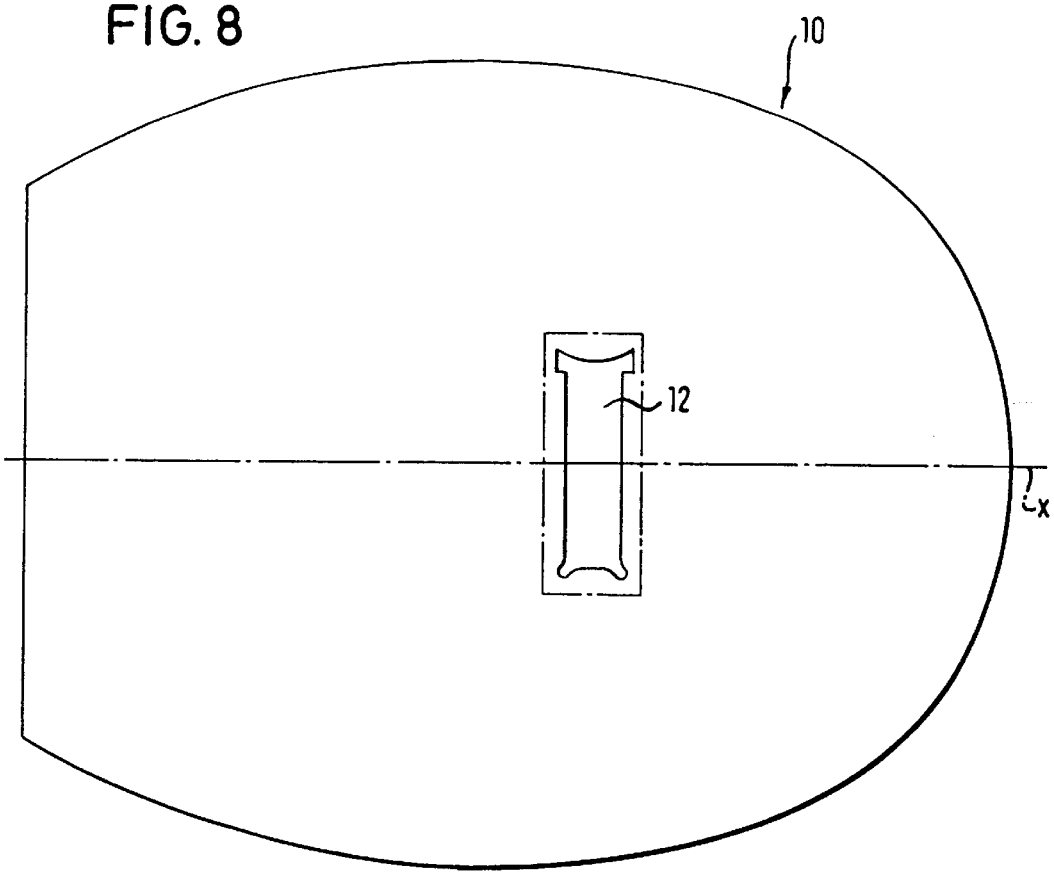
FIG. 8 shows in a diagrammatic top view a gas bag on the passenger side, which is provided to be folded together by a method according to the invention in accordance with a second embodiment.

In FIG. 8, a gas bag on the passenger side is illustrated, which is provided to be folded by a method according to the invention in accordance with a further embodiment. For better clarity, here only the fold tongues used for the folding are illustrated; also in this embodiment, the device has the further components known from FIGS. 1 and 2, in particular the base and the plate between which the gas bag is unfolded to its packing height. After the unfolding, firstly, first fold tongues 120, which are arranged parallel to the longer longitudinal axis x of the gas bag 10, are moved towards the interior of the gas bag. Here, the fold tongues 120 are firstly moved in a straight line in the plane defined thereby towards the interior of the gas bag 10, and are subsequently displaced in a parallel manner towards each other, and finally are moved towards each other again in the plane defined by them. In the final position achieved in this way, the fold tongues are designated by the reference number 120'. The path covered by the fold tongues 120 is designated by the reference number 120". Wall flaps 28 are formed between the fold tongues 120'.

As can be seen in FIG. 11, in addition to the illustrated fold tongues 20, two further fold tongues 121 can also be used, which are arranged on the axis X and are moved along the latter without parallel displacement towards the interior of the gas bag 10. In the end position, these fold tongues are designated by the reference number 121'.

Figure 10:
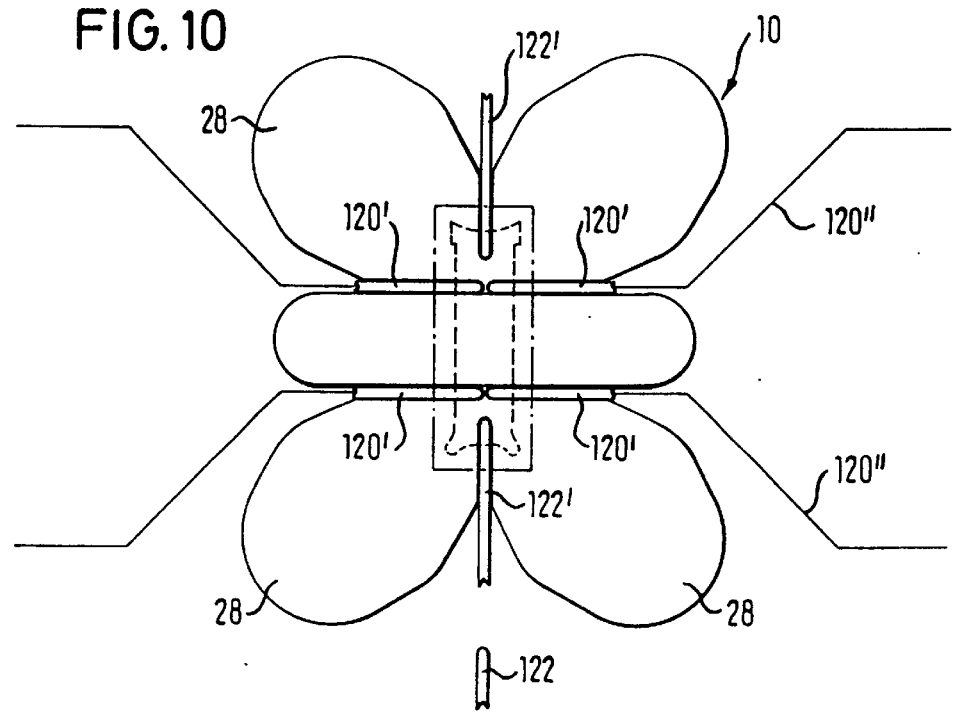
FIG. 10 shows the gas bag of FIG. 9 after a further folding step.

In FIG. 10, further fold tongues 122' are to be seen, which extend perpendicularly to the fold tongues 121. These fold tongues 122' were pressed into the large wall flaps 28 lying on the outside, which are present according to the folding step of FIG. 9. The gas bag illustrated in FIG. 10 in a state after the fold tongues 122 have been pressed in is reminiscent of a clover leaf owing to the large wall flaps lying on the outside.

In FIG. 11, the final step for folding the gas bag 10 is illustrated. This step consists in that additional fold tongues 123 are pressed into the wall flaps lying on the outside which are present after the preceding folding step. The fold tongues 123 are arranged in an angle of 45° each with respect to the axis x.

The embodiment of the invention illustrated in FIGS. 8 to 11 therefore substantially consists of folding together the gas bag to be folded, by means of three groups of fold tongues. A first and a second group is used, consisting in the illustrated embodiment of the fold tongues 122 and 123 and lying opposite each other, and also a third group which consists of the fold tongues 120 and 121 and extends between the first and second group. If it proves to be necessary, for each of these groups more fold tongues can be used than the illustrated three or six fold tongues. Then, in each case, smaller wall flaps are produced between the individual fold tongues.

A partial vacuum is applied to its chamber by means of the device for introducing a pressurized medium into the gas bag chamber, after the gas bag 10 has been folded together to the desired shape. Then, the fold tongues can be withdrawn from the wall package of the withdrawn gas bag, without this altering its shape. Thereafter, the folded gas bag can either be inserted directly into a mounting provided for it, or it can be provided with a band so that it does not unfold again.

Figure 12:
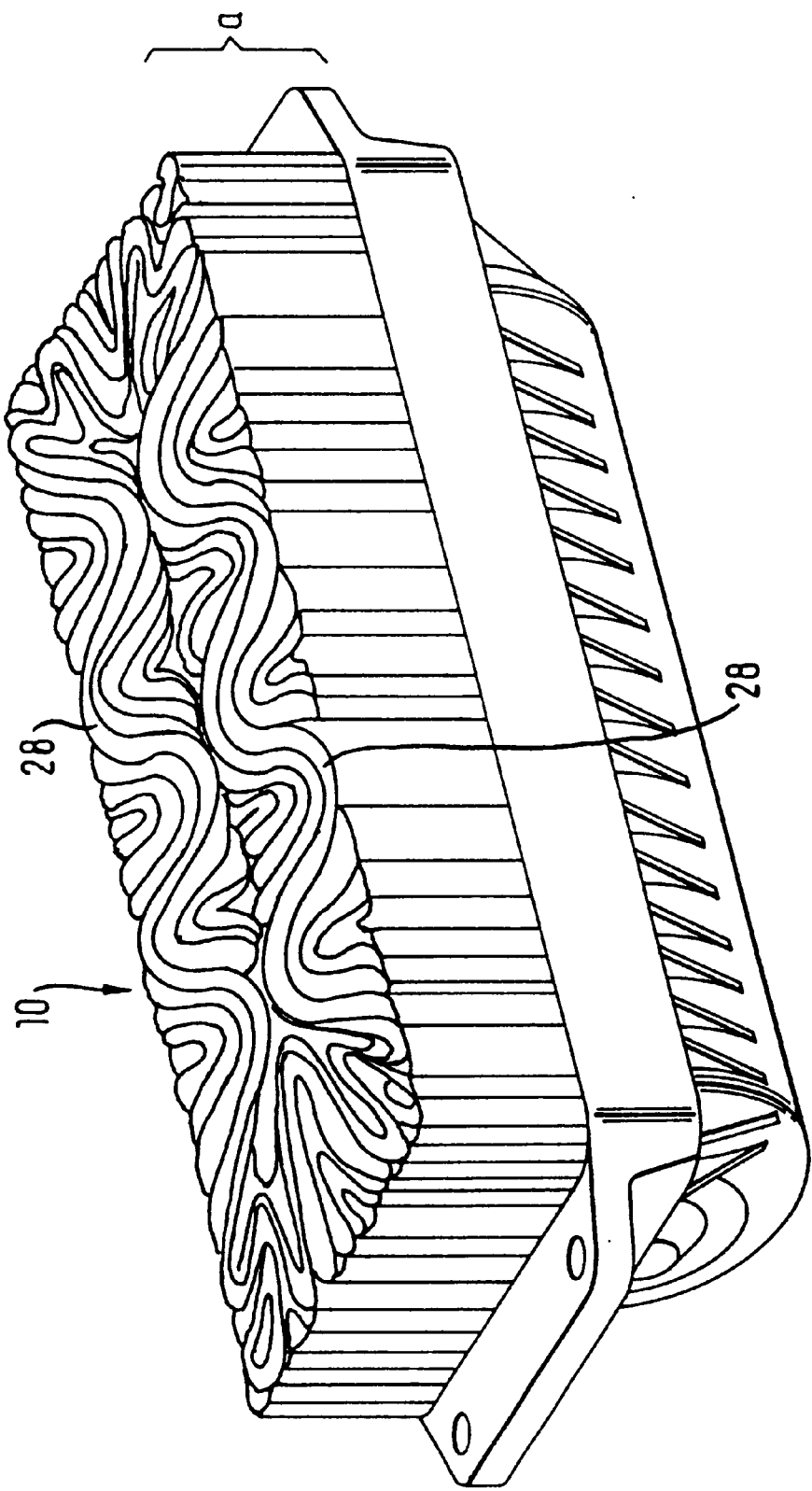
FIG. 12 shows in a diagrammatic perspective view the gas bag from FIGS. 8 to 11, which after folding is arranged on a gas bag module.

In FIG. 12, a gas bag 10 is illustrated in a diagrammatic perspective view, which was folded together by the method illustrated in FIGS. 8 to 11. It can clearly be seen that the folded gas bag has a height "a" which corresponds to the packing height and is given by the distance in which the plate 19 is arranged from the base 16. Furthermore, it can be seen that the folded gas bag consists of a plurality of wall flaps 28 lying adjacent to each other. These wall flaps run from the outside inwards and also substantially perpendicularly to the upper side of the folded gas bag.

Figure 13:
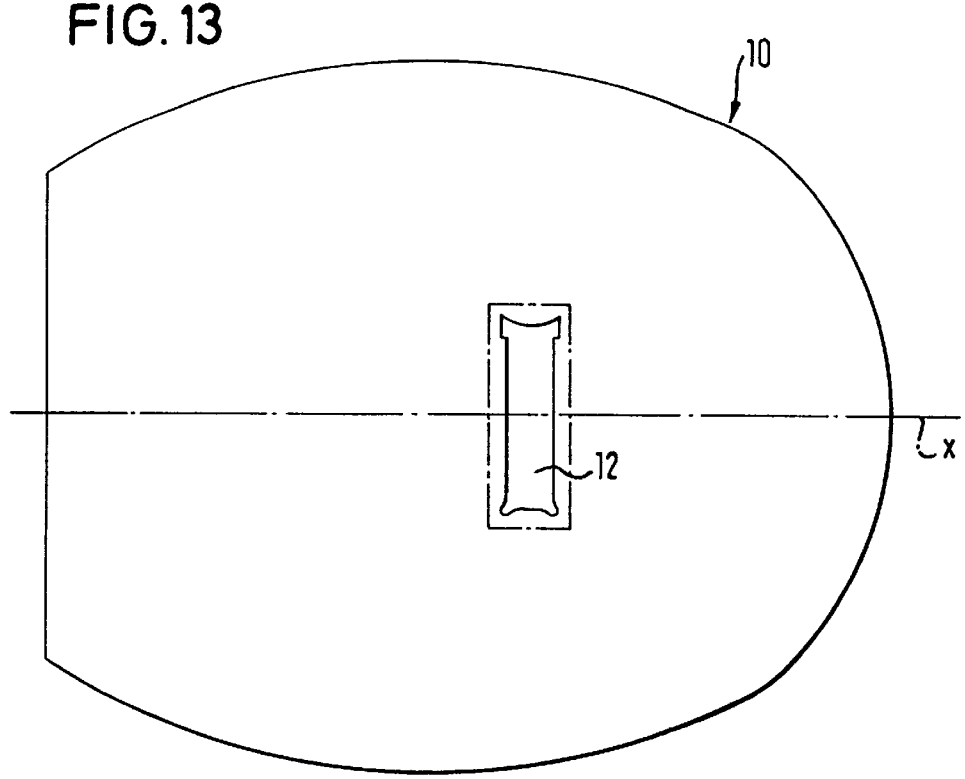
FIG. 13 shows in a diagrammatic top view a gas bag on the passenger side, which is provided to be folded together by a method according to the invention in accordance with a third embodiment.
Figure 14:
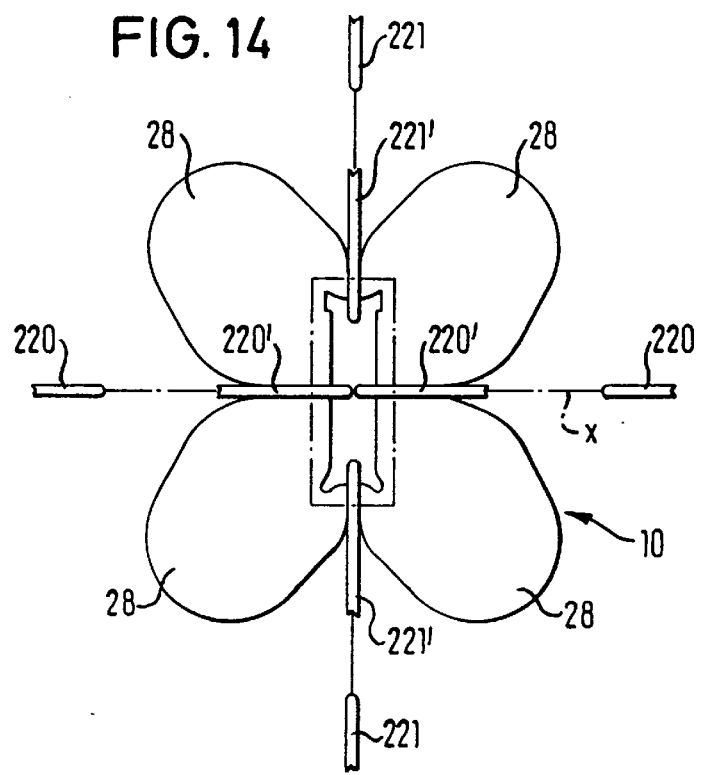
FIG. 14 shows the gas bag of FIG. 13 after a first folding step.

In FIG. 13, a gas bag 10 on the passenger side is illustrated, which is provided to be folded together by a further embodiment of the invention. For this purpose, fold tongues 220 or 221 are used, which are arranged lying opposite each other in pairs. These fold tongues 220 or 221 press the wall of the gas bag 10, which also in this embodiment is unfolded between a base and a plate of the device for folding the gas bag, inwardly towards the interior of the gas bag on four lines spaced apart from each other. In this way, four wall flaps 28 are formed which are arranged in the manner of a clover leaf.

Figure 15:
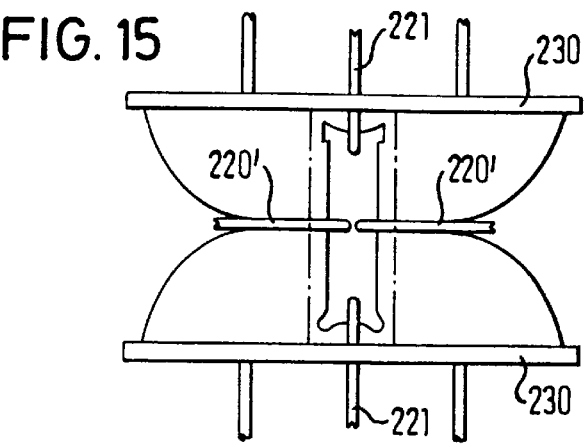
FIG. 15 shows the gas bag of FIG. 14 after a second folding step.
Figure 16:
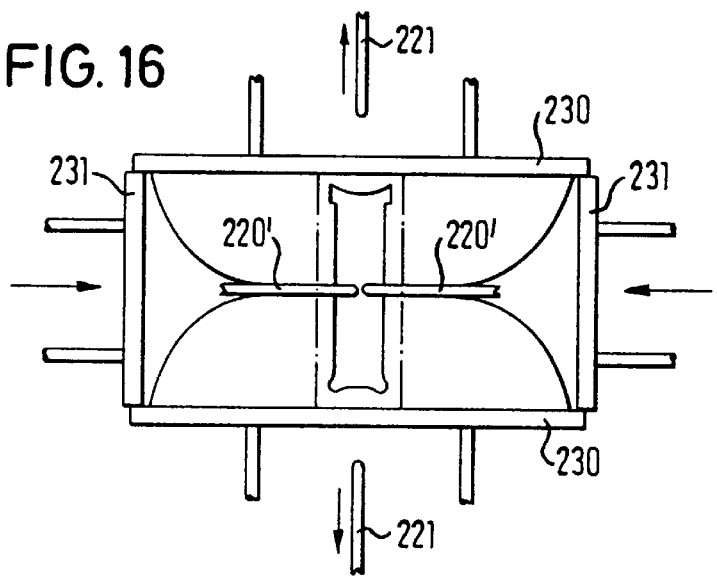
FIG. 16 shows the gas bag of FIG. 15 after a further folding step.

In the next step (FIG. 15), two fold sliders 230, which run parallel to the axis x, are moved perpendicularly to this axis towards the center of the gas bag. Then, the fold tongues 221 are withdrawn towards the outside (FIG. 16).

Figure 17:
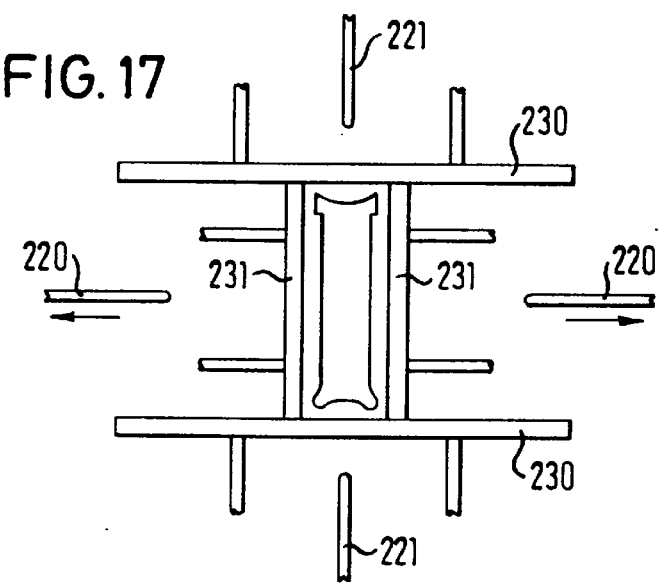
FIG. 17 shows the gas bag of FIG. 16 after the last folding step.

In the next step, two further fold sliders 231, which extend perpendicularly to the axis x and to the fold sliders 230, are pushed together from the outside towards the interior of the gas bag 10 (FIG. 17). As a final step, the fold tongues 220 which are perpendicular to the fold sliders 231 are withdrawn from the folded gas bag. The gas bag is now folded together completely.

The method according to the invention is based as a whole on the following two main steps: Firstly, the gas bag is unfolded between a base and a plate which are spaced apart from each other with the height of the folded gas bag to be obtained, and then the entire wall of the gas bag is pushed together towards the center of the gas bag. This can take place either completely by means of fold tongues or by means of a combination of fold tongues and fold sliders. All embodiments of the method according to the invention have in common the fact that the wall of the gas bag is not folded together in precisely defined flat layers, but rather is pushed together in a plurality of wall flaps. These wall flaps are given in each case precisely by the fold tongues used; within a wall flap, the course of the wall is not defined, however. It is consciously taken into account that the respectively obtained folding pattern of the gas bag differs slightly from fold to fold. These slight differences are without importance, however, for the unfolding of the gas bag; only by the wall flaps, given by the fold tongues, is an unfolding process achieved which is reproducible at any time. For this unfolding process, also, the deformations of the wall of the gas bag which arise within a wall flap on pushing the wall together are without importance.

What is claimed is:

1. A method of folding a gas bag for a vehicle occupant restraint system, said gas bag having a wall delimiting a chamber and having an inflation opening, said inflation opening having a rim, said method comprising the following steps:

spreading said gas bag out on a first planar surface of a base, holding said rim of said inflation opening of said gas bag fixed with respect to said base, locating a plate having a second planar surface parallel to said first planar surface and fixed at a predetermined distance from said first planar surface throughout inflating and folding of said gas bag, and exposing said chamber of said gas bag to a positive pressurized medium so that said gas bag is unfolded into a substantially flattened shape and is pushed by said pressurized medium against said first planar surface and against said second planar surface, pressing said wall of said gas bag inwards by a plurality of fold tongues spaced apart from each other in a circular configuration around a circular outer periphery of said wall and which are displaced along a linear path parallel to said first and second planar surfaces and which displacement of said fold tongues into said wall forces at least some of the pressurized medium out of said chamber and forms a plurality of indentations in said wall, each indentation corresponding to each of said fold tongues, each indentation extending from said plate to said base in a direction perpendicular to said first and second planar surfaces, and withdrawing said fold tongues from said wall, said exposing said chamber of said gas bag to a positive pressure, said pressing and said withdrawing being performed while said first and second planar surfaces are fixed at said predetermined distance and while the entire gas bag lies between said base and plate.

2. The method of claim 1, wherein said gas bag chamber is exposed to a positive pressurized medium of less than 100000 Pa during said exposing step.

3. The method of claim 2, wherein said gas bag chamber is exposed to a positive pressurized medium of less than 50000 Pa during said exposing step.

4. The method of claim 1, wherein a partial vacuum is applied to said gas bag chamber after said pressing step.

5. The method of claim 1, wherein said pressing step creates folds in said gas bag wall which retain their shape during at least one of any subsequent steps.

6. The method of claim 1, wherein said gas bag, when folded, has a packing height corresponding approximately to said predetermined distance between said base and said plate.

7. The method of claim 1, wherein said wall is further pushed towards said interior of said gas bag by fold sliders after said wall has been pushed inwards by said fold tongues, said fold sliders extending perpendicular to said fold tongues.

8. The method of claim 7, wherein said gas bag chamber contains a predetermined volume of pressurized gas after said exposing step, at least part of said volume of said gas being allowed to escape from said chamber when one of said fold tongues or fold sliders are pressed inwardly.

9. The method of claim 1, wherein said fold tongues extend perpendicular to said base and said plate a distance corresponding to said predetermined distance.

10. A method of folding a gas bag for a vehicle occupant restraint system, said gas bag having a wall delimiting a chamber and having an inflation opening, said inflation opening having a rim, said method comprising the following steps:

spreading said gas bag out on a first planar surface of a base, holding said rim of said inflation opening of said gas bag fixed with respect to said base, locating a plate having a second planar surface parallel to said first planar surface and fixed at a predetermined distance from said first planar surface throughout inflating and folding of said gas bag, and exposing said chamber of said gas bag to a positive pressurized medium so that said gas bag is unfolded into a substantially flattened shape and is pushed by said pressurized medium against said base and against said plate, utilizing a plurality of spaced apart fold tongues arranged in a radial configuration around an outer radial periphery of said wall to press a portion of said wall of said gas bag inwards against the pressurized medium by displacing said fold tongues along a plane parallel to said first and second planar surfaces and which displacement of said fold tongues into said portion of said wall forces at least some of the pressurized medium out of said chamber and forms a plurality of indentations in said wall, each indentation corresponding to each of said fold tongues, each indentation extending from said plate to said base in a direction perpendicular to said first and second planar surfaces, utilizing a plurality of fold sliders to push said portion of said wall towards an interior of said gas bag by displacing said fold sliders along a plane parallel to said first and second planar surfaces and subsequent to said fold tongues pressing said wall and which displacement of said fold sliders into said portion of said wall forces more of the pressurized medium out of said chamber and forms a plurality of additional indentations in said wall, each additional indentation corresponding to each of said fold sliders, each additional indentation extending from said plate to said base in a direction perpendicular to said first and second planar surfaces, and withdrawing said plurality of fold tongues from said wall of said gas bag while said plurality of fold sliders remain in place, said exposing said chamber of said gas bag to a positive pressurized medium, said pressing and said withdrawing being performed while said first and second planar surfaces are fixed at said predetermined distance and the entire gas bag lies between said base and said plate.

11. A method of folding a gas bag for a vehicle occupant restraint system, said gas bag having a wall delimiting a chamber and having an inflation opening, said inflation opening having a rim, said method comprising the following steps:

spreading said gas bag out on a first planar surface of a base, holding said rim of said inflation opening of said gas bag fixed with respect to said base, locating a plate having a second planar surface parallel to said first planar surface and fixed at a predetermined distance from said first planar surface throughout inflating and folding of said gas bag, exposing said chamber of said gas bag to a positive pressurized medium so that said gas bag is unfolded into a substantially flattened shape and is pushed by said pressurized medium against said first planar surface and against said second planar surface, pressing said wall of said gas bag inwards by a plurality of fold tongues spaced apart from each other around an outer periphery of said wall by displacing said fold tongues along a linear path parallel to said first and second planar surfaces to form a plurality of indentations in said wall, each indentation corresponding to each of said fold tongues, and each indentation extending from said plate to said base in a direction perpendicular to said first and second planar surfaces, and withdrawing said fold tongues from said wall, said exposing said chamber of said gas bag to a positive pressure, said pressing and said withdrawing being performed while said first and second planar surfaces are fixed at said predetermined distance and while the entire gas bag lies between said base and plate.

* * * * *